(12) United States Patent
Chang (10) Patent No.: US 7,061,645 B2
(45) Date of Patent: Jun. 13, 2006

(54) NON-SEGMENTATION, INDIVIDUAL PIXEL-BY-PIXEL-BASED IMAGE RENDERING SYSTEM

(75) Inventor: Ching-Wei Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 874 days.

(21) Appl. No.: 09/967,281

(22) Filed: Sep. 27, 2001

(65) Prior Publication Data
US 2003/0058461 A1    Mar. 27, 2003

(51) Int. Cl.
*H04N 1/40* (2006.01)

(52) U.S. Cl. ......................... 358/1.9; 358/2.1
(58) Field of Classification Search .............. 358/1.9, 358/2.1, 3.06, 3.24, 3.13–3.19; 382/237
See application file for complete search history.

(56) References Cited

U.S. PATENT DOCUMENTS

| | | | |
|---|---|---|---|
| 4,930,018 A | 5/1990 | Chan et al. ................. 358/298 |
| 5,327,262 A * | 7/1994 | Williams .................... 358/462 |
| 5,493,416 A | 2/1996 | Fan ............................ 358/447 |
| 5,535,019 A | 7/1996 | Eschbach ................... 358/456 |
| 5,611,022 A | 3/1997 | Estrada et al. ............. 395/109 |
| 5,627,659 A | 5/1997 | Kakutani .................... 358/443 |
| 5,692,109 A | 11/1997 | Shu ............................ 395/109 |
| 5,704,021 A | 12/1997 | Smith et al. ................ 395/109 |
| 5,737,453 A | 4/1998 | Ostromoukhov ........... 382/275 |
| 5,739,917 A | 4/1998 | Shu et al. ................... 358/298 |
| 5,757,976 A | 5/1998 | Shu ............................ 382/252 |
| 5,946,455 A | 8/1999 | Tresser et al. ............. 395/109 |
| 5,970,718 A | 10/1999 | Arnold ........................ 62/3.5 |
| 6,040,927 A | 3/2000 | Winter et al. .............. 358/534 |
| 6,137,918 A * | 10/2000 | Harrington et al. ........ 382/269 |
| 6,144,461 A * | 11/2000 | Crean et al. ................ 358/1.9 |
| 6,144,775 A | 11/2000 | Williams et al. .......... 382/252 |
| 6,243,499 B1 * | 6/2001 | Loce et al. ................. 382/269 |
| 6,252,675 B1 * | 6/2001 | Jacobs ........................ 358/1.9 |
| 6,480,626 B1 * | 11/2002 | Venable ..................... 382/180 |
| 6,625,312 B1 * | 9/2003 | Nagarajan et al. .......... 358/2.1 |
| 6,639,692 B1 * | 10/2003 | Li et al. ..................... 358/2.1 |
| 6,683,702 B1 * | 1/2004 | Loce et al. ................. 358/3.09 |

FOREIGN PATENT DOCUMENTS

JP         07065181 A    8/1993

* cited by examiner

*Primary Examiner*—Riomas D. Lee
*Assistant Examiner*—Stephen Brinich
(74) *Attorney, Agent, or Firm*—David C. Ripma (57) ABSTRACT

A non-segmentation, individual pixel-by-pixel-based image rendering system and method provides processing of heterogeneous or homogeneous images, wherein each image comprises a multiplicity of pixels. Each pixel of the image has image information attached thereto. Subsequently, each pixel is processed and rendered according to the attached image information. The pixel-based image rendering system improves the quality of the printed heterogeneous or homogeneous images because each pixel of the image is rendered individually according to the attached image information.

18 Claims, 5 Drawing Sheets

Figure 1

Prior Art

NON-SEGMENTATION, INDIVIDUAL PIXEL-BY-PIXEL-BASED IMAGE RENDERING SYSTEM

FIELD OF THE INVENTION

The present invention relates generally to digital imaging and, more particularly, to a non-segmentation system and related methodology for rendering an image to a printer or other image output device for producing images made up of a large plurality of pixels.

BACKGROUND

Ongoing improvements in personal computers allow users to prepare documents of increasing complexity and variety. Printer manufacturers are increasingly challenged to develop printing systems capable of printing high-quality, high-resolution heterogeneous documents. As the term is used herein, heterogeneous documents are documents that include more than one of the following: images, graphics, and text. Ideally, heterogeneous documents printed by printers accurately reproduce what is composed on a high-resolution computer monitor.

As an example of one of the challenges facing the printing industry, computer monitors are based on a color regime of red, green and blue pixels (RGB), whereas color printers, namely, inkjet printers, are typically based on a color regime of cyan, magenta, yellow and black (CMYK). The RGB color components of computer monitors are combined together in an "additive" way by mixing red, green and blue light rays to form a plurality of different displayable colors. In contrast, the CMYK components of color inks are applied to media in different combinations in a "subtractive" way to form a plurality of printable colors consistent with CMYK ink cartridges typically contained within the inkjet printer. Transforming images from "RGB space" to "CMYK space" necessary for printing the image on an inkjet printer requires the use of color-rendering techniques.

One color-rendering technique is halftoning. A halftoning algorithm is a process of transforming a continuous-tone image into a binary image that gives the illusion of the original continuous-tone image. Use of a single halftoning algorithm, when rendering a document, works well when the content of the document to be printed is homogeneous. For example, if the content of the document to be printed consists of only text, or only graphics, etc., an algorithm could be selected that will optimally render the text or graphics to the printer. In contrast, when a document is heterogeneous, containing various mixtures of text, graphics, or images, prior art single halftoning processes do not work as well because a given halftoning algorithm is directed to optimal rendering of only a single type of image.

Prior-art image rendering systems have attempted to address this problem. For example, U.S. Pat. Nos. 5,327,265 and 5,272,549 attempted to address the aforementioned problem by using a method wherein both text and images are printed separately, but in the same document. These methods include combining inkjet and laser printer components in a printing system in which the printed information is divided into color and text. The color images are printed using the inkjet printer component and the text (or non-color material) is printed by the laser printer component. This approach has the disadvantage of requiring very complex printers in order to print heterogeneous documents.

U.S. Pat. Nos. 5,704,021 and 6,040,927 disclose methods of color inkjet printing for use in printing documents having different color object types. Based on the identified color object type, selected color rendering options are used by the color inkjet printer to produce the document. The prior-art systems in the '021 and '927 patents require categorizing areas of a heterogeneous document to be printed, based on the type of objects contained in regions of the document, and then rendering the objects accordingly.

It would be advantageous to have an image rendering system capable of (1) improving print quality of heterogeneous images, (2) increasing the, speed at which heterogeneous images are rendered to a printer and, (3) rendering high quality heterogeneous images to relatively inexpensive conventional printers such as inkjet printers without being limited by object type.

SUMMARY OF THE INVENTION

The present invention provides a non-segmentation, individual pixel-by-pixel-based image rendering system and method of pmcessing source image data for instnicting an output device in providing an image having a plumlity of pixels. Each pixel has a predetermined number of data bits that are processed by coupling image information to each pixel, assessing the image information for each pixel, and rendering each pixel of the image according to the image information coupled to each pixel.

The invention further provides a pixel based image rendering system for instructing a printer in providing an image having a plurality of pixel data sets. The image rendering system includes a data storage device for temporarily is storing the pixel data sets of the image and a software means for associating one or more image information bits to each pixel data set in the data storage device. Additionally, the image rendering system contains a print processing means responsive to the pixel data sets and the image information bits. The image information bits are associated with each pixel data set for rendering the pixels of the image using an image rendering process selected by the image information associated with each pixel data set.

DETAILED DESCRIPTION OF THE EMBODIMENT

Figure 1:
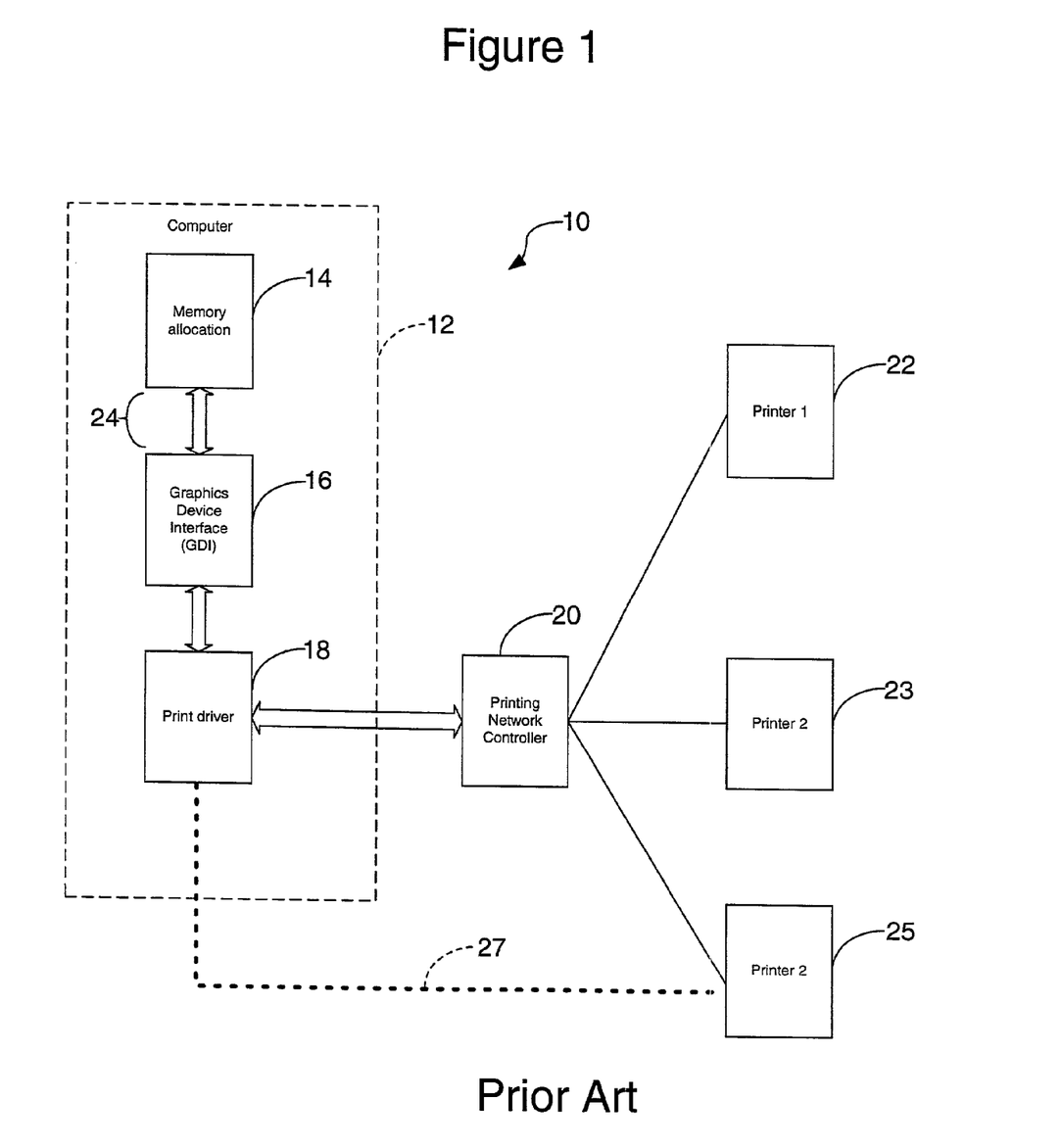
FIG. 1 is a schematic illustration of a prior art printing system used to generate and print documents or images.

FIG. 1 is a schematic representation of a prior-art printing system 10 used to generate and print documents or images. Printing system 10 includes a computer 12 having a memory allocation block 14, a graphics device interface (GDI) 16, and a print driver 18. The computer 12 is connected to printer 22 or a plurality of printers via a printing network 20. Box 20 is also referred to herein as a network controller or a printing network controller. Printing network 20 is connected to a plurality of printers, represented in FIG. 1 by printer 22 and additional printers 23 and 25, which may be selectively connected to computer 12 via controller 20. Alternatively, one or more printers may be operatively connected directly to the print driver 18 of computer 12, as illustrated schematically in FIG. 1 by dashed line 27. In the description of the present invention provided below, it will be understood by those skilled in the art that a printer shown connected to a print driver may, alternatively, within the scope of the present invention, be connected via a suitable network or via direct connection.

Memory allocation block 14 of computer 12 supports application software, such as word processors, spreadsheets, and database rendering systems. Additionally, computer-aided design and imaging software, such as AutoCAD and PhotoShop, respectively, are supported by memory allocation block 14. The various software applications may be used to generate homogeneous or heterogeneous images consisting of a multiplicity of pixels. When the pixels of the homogeneous or heterogeneous images are to be printed, they form an image data stream 24 as they pass through computer 12 in route to printer 22.

GDI 16 of computer 12 is used by most Windows applications to display images on a monitor. The GDI is instrumental when printing from a Windows application to a printer because the data (including image data stream 24) generated by the program does not need to be converted to printer controller language, for example, PostScript (Trademark). Hence, the user can print a homogeneous or heterogeneous image, viewable on a computer's monitor, directly to a printer, or indirectly to a printer through printing network 20, via print driver 18. Print driver 18 converts the application data received from GDI 14 to image data printable on printer 22.

Figure 2:
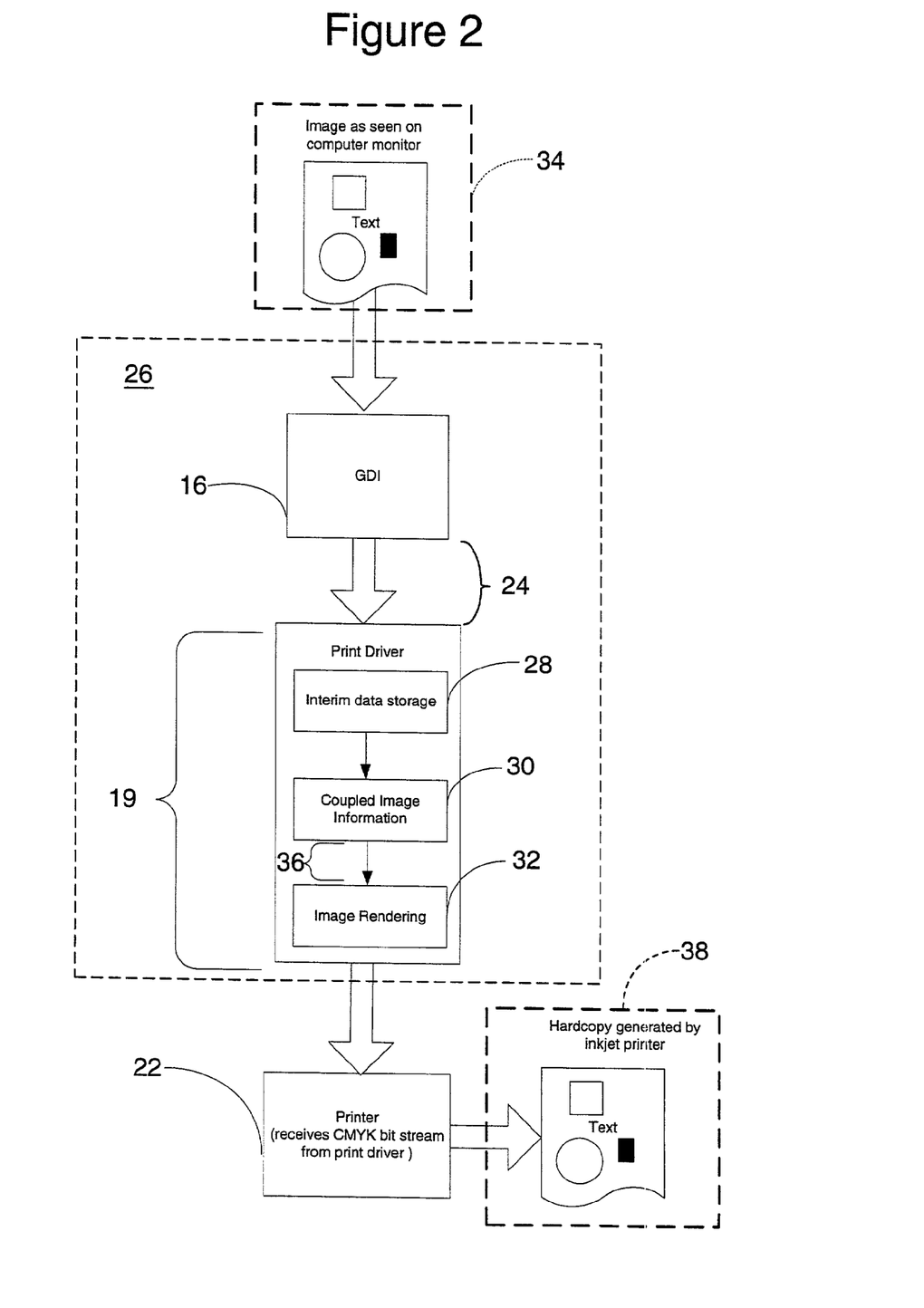
FIG. 2 is a schematic representation of an image rendering system for pixel based image rendering in accordance with the present invention.

FIG. 2 is a schematic representation of one embodiment of the non-segmentation, individual pixel-by-pixel Image Rendering System (IRS) 26 employing an illustrative embodiment of the present invention and implementing the methodology of this invention. For the purpose of the present invention, IRS 26 refers to a digital imaging process for converting image data in its original form, as it emerges from an image source such as a GDI, to another form suitable for printing on a binary printer such as, for example, an inkjet printer. IRS 26 employs image rendering processes including halftoning processes and color rendering algorithms. IRS 26 includes GDI 16, and an IRS print driver 19. IRS print driver 19 further includes an interim data storage block 28, a coupled image information block 30, and a document rendering block 32.

A heterogeneous image 34 created by a software application may contain any combined multiplicity of monochrome or color text pixels, monochrome or color image pixels, monochrome or color graphics pixels, or white pixels. A homogeneous image, in contrast, is composed of only one pixel type. A homogeneous or heterogeneous image is alternatively referred to herein as a homogeneous or heterogeneous document.

GDI 16 operates on the source image pixels and outputs the pixels as an image data stream 24 to interim data storage block 28 within IRS print driver 19. Blocks 28, 30, and 32 illustrate process steps carried out in IRS print driver 19. Within IRS print driver 19, pixel data, which is temporarily stored in interim storage 28, is coupled to image information, such as information identifying the pixel type, in step 30. Attaching image information may sometimes be referred to herein as 'adding' image information to each pixel. Adding, for the purpose of this invention, means associating or coupling image information to each pixel. The attached image information is associated with one of four different pixel types, as will be described in greater detail below. The modified pixel information 36 is then rendered in block 32. IRS print driver 19 renders images in accordance with the present invention using attached image information, as will be described in below.

Printer 22, for example, an inkjet printer, then prints a hard copy 38 of heterogeneous image 34. One skilled in the art will recognize that although IRS 26 is coupled to only one printer, IRS print driver 19 could be used to render a heterogeneous or homogeneous image to a plurality of printers through a printing network as illustrated in FIG. 1.

Figure 3A:
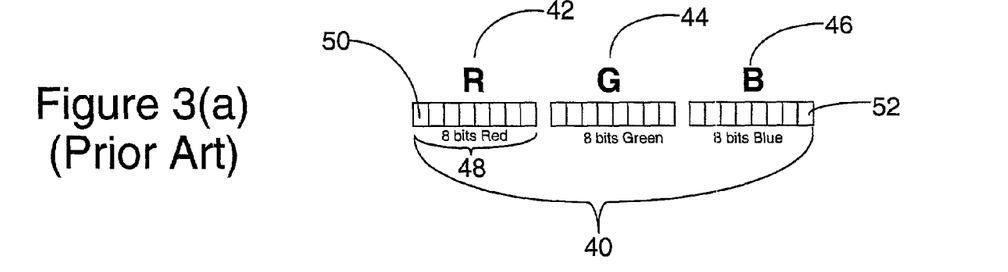
FIG. 3(a) is a pictorial representation of a pixel data set of the type used as source image data (prior art).

FIG. 3(a) is a pictorial representation of a pixel 40, also referred to as a data set or pixel data set, taken from the multiplicity of pixels forming image data stream 24 as shown in FIG. 2. Pixel 40 as discussed herein is a single point in a graphic image capable of being displayed on a computer monitor. The number of bits in pixel 40 determines how many variables define the pixel, such as colors, intensities or shades of gray, etc. that can be displayed. In the illustrated embodiment of the invention, a color monitor or display system uses 24 bits (8 bits-red; 8 bits-green; 8 bits-blue) for each pixel 40, making it possible to display 2-to-the 8th power (256) different colors or shades of gray. Each pixel is composed of three segments or bytes; red 42, green 44, and blue 46 (RGB). Each segment of pixel 40 consumes eight bits, shown in FIG. 3(a) at 48, or equivalently a byte of memory. Furthermore, pixel 40 has a most significant bit 50 and a least significant bit 52. Pixel 40, when this term is used herein as a data set, may alternatively be called a pixel data set.

Figure 3B:
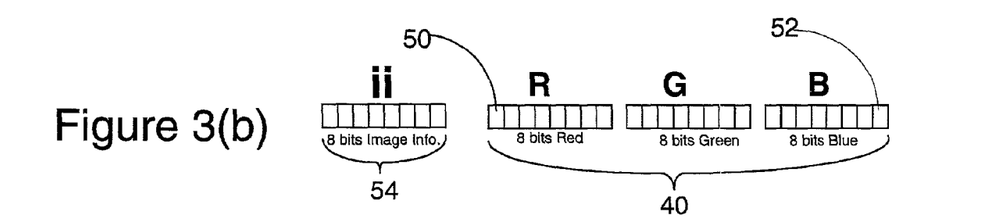
FIG. 3(b) is a pictorial representation of the pixel data set, as in FIG. 3(a), with the addition of image information bits adjacent a most significant bit of the pixel data set.

FIG. 3(b) is a pictorial representation of pixel 40 as shown in FIG. 3(a), with eight additional image information bits added to pixel 40. As discussed herein, a bit is the smallest unit of information on a computing machine such as, for example, a computer. A single bit can hold only one of two values: 0 or 1. More information is obtained by combining consecutive bits into larger units. For example, a byte is composed of 8 consecutive bits. The furthest right bit in a byte, as depicted in FIG. 3(b), represents the least significant bit and tile furthest left bit of a byte represents the most significant bit.

Figure 3C:
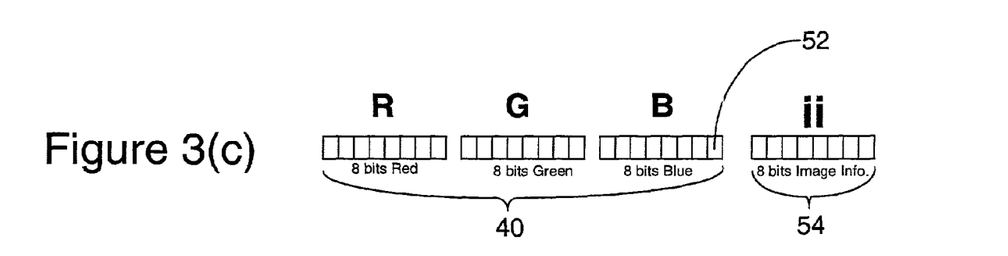
FIG. 3(c) is a pictorial representation of the pixel data set, as in FIG. 3(a), with the addition of image information bits adjacent a least significant bit of the pixel data set.

The additional information, henceforth referred to as image information 54, (or alternatively image information bits) is illustrated as 'ii' in FIG. 3(b) and is added to pixel 40 using a suitable software routine. In the embodiment of the invention shown in FIG. 3(b), image information 54 is added adjacent the most significant bit 50 of pixel data set 40. Alternatively, FIG. 3(c) shows information bits 54 added adjacent the least significant bit 52 of pixel data set 40.

Those skilled in the art will recognize that although image information 54 is added to most significant bit 50 or least significant bit 52, image information 54 may be added to pixel 40 in other positional locations and still fall within the scope of the present invention.

In the image processing system of the present invention, the associating of one or more image information bits 54 with each pixel data set 40 is preferably carried out in IRS print driver 19 (FIG. 2). The pixel data sets arriving via image data stream 24 from GDI 16 are stored in a suitable interim data storage memory 28, such as a buffer. The step of coupling or adding image information bits 54 to each pixel data set 40 is preferably carried out in memory 28, wherein suitable software associates the image information with each pixel. The output of the GDI 16 contains the necessary information to display the content of a document, be it text, vector, or bitmap, etc. The information is accessible in the form of commands and in the data structure of the GDI output The information bits coupled to each pixel in the present invention are derived from the commands and data structure of the GDI output. After image information bits 54 are coupled to each pixel data set 40, the result, termed modified image information 36, provides enhanced pixel data which is used in rendering images to a printer 22, the resultant images closely approaching the source image 34 which appeared on the computer monitor.

In a first embodiment of the present invention, image information 54 is coupled to individual pixel data sets to differentiate between four image rendering options. If, for example, four image rendering options are available, only two image information bits 54 are required for each pixel data set 40. The number and types of image rendering options available is a matter of design choice and may be as few as two different options, or more that four, depending on the number of image information bits 54 associated with each pixel data set 40. The image rendering options include, for example, selected halftoning systems and other image rendering processes used to sharpen, define, or enhance images rendered to printers. Table 1 below provides an illustration of four pixel rendering options and associated image information bits 54.

TABLE 1

Image information association

| 1st image information bit | 2nd image information bit | Pixel Rendering Options |
| --- | --- | --- |
| 0 | 0 | White |
| 0 | 1 | Monochrome |
| 1 | 0 | Color image |
| 1 | 1 | Text/edge |

Figure 3D:
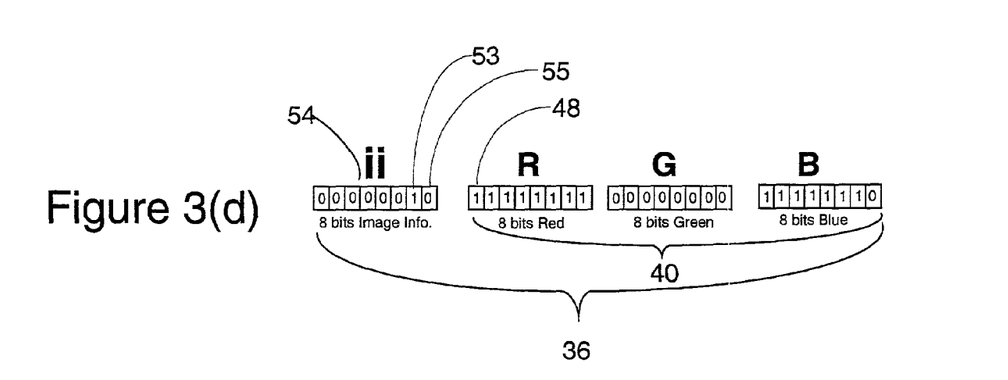
FIG. 3(d) together with the detailed description provided below, illustrates how a pixel, as shown in FIG. 3(b), is rendered in accordance with the present invention.

Table 1 and FIG. 3(d) illustrates how the attached image information 54 affects the rendering of pixel 40. Pixel 40 includes the following 24 bits: 111111110000000011111110. Information bits 54 are 00000010. The resultant modified pixel information 36 becomes: 0000001011111111100000000111111110. In this example, the image information bits 54 are "10" which corresponds to the color image rendering option in Table 1. When modified pixel information 36 is received by image rendering block 32 in IRS print driver 19, as shown in FIG. 2, pixel 40 will be rendered as a color image pixel. As the term is used in the present invention, rendering is a manner of taking a continuous tone image and replicating it for both color and spatial content using a non-continuous tone imaging method. Rendering options relied upon in replicating the continuous tone image may include halftoning techniques such as error diffusion and matrix thresholding. Employing such rendering options serve to ultimately improve the appearance of the printed image.

In the illustrative embodiment of the present invention, a halftoning process is associated with each state of image information 54. Assuming two image information bits, a pixel with a first image information bit of "1" and a second image information bit of "1" (11) is rendered, for example, using a halftoning process specifically designed to optimally render a text/edge pixel. In contrast, when the first image information bit is a "0" and the second image information bit is a "1" (01), the pixel is rendered using a halftoning process specifically designed to optimally process a monochrome pixel. A detailed description expounding on a method by which each pixel of a heterogeneous or homogeneous image is rendered is described below.

Figure 4:
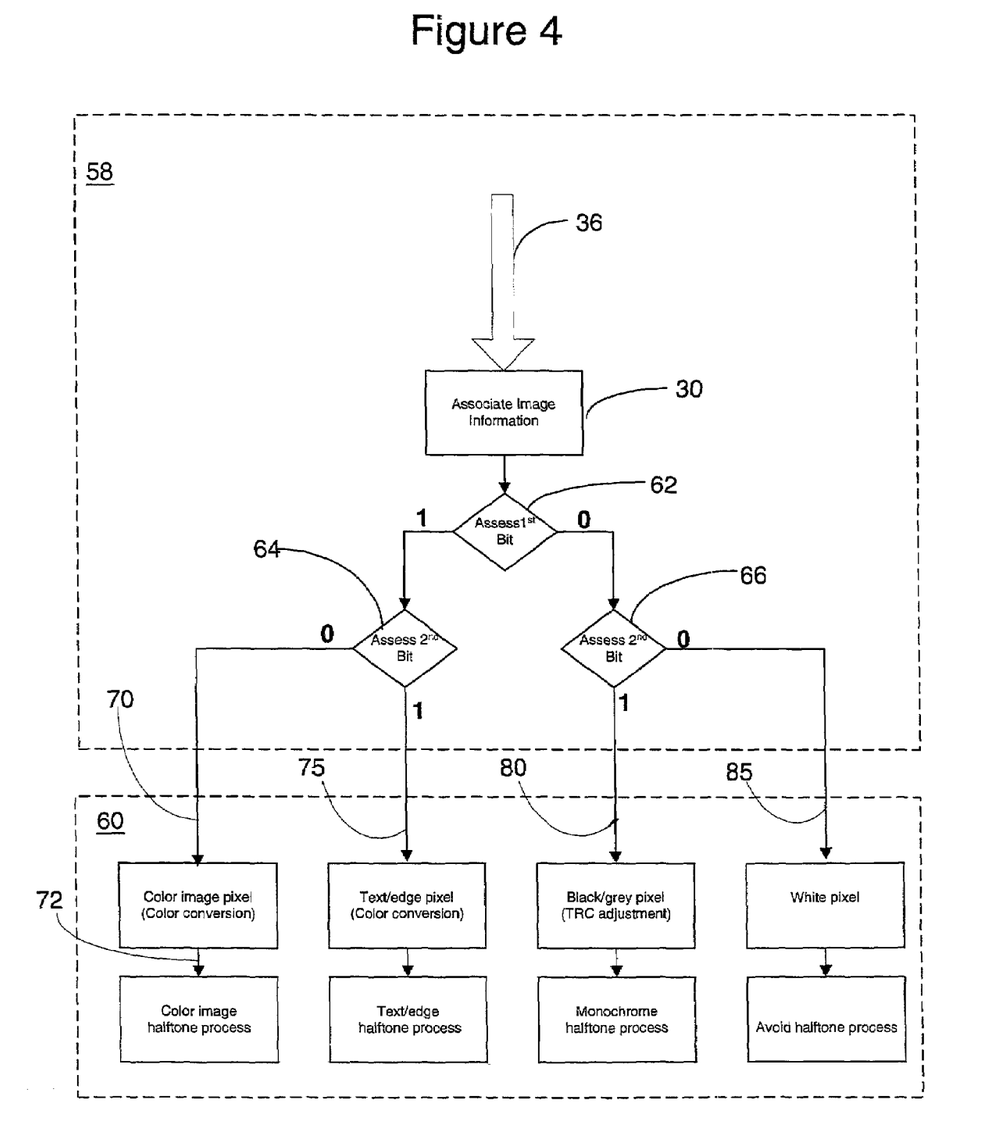
FIG. 4 is a schematic illustration of a sequence of steps by which image information is associated with each pixel of the data set.

FIG. 4 is a schematic representation of a sequence of steps, by which modified pixel information 36 is assessed and rendered to a printer 22 by IRS print driver 19 previously described in FIG. 2. The modified pixel information 36 results from the coupling of two image information bits 54 to pixel data set 40. FIG. 4 is separated into an assessment section 58 and a rendering section 60 as described below.

Assessment section 58 of FIG. 4 has a first bit assessment block 62 and two second bit assessment blocks, 64 and 66, respectively. First bit assessment block 62 assesses a first image information bit 53 of image information 54 whereas second bit assessment blocks 64 and 66 assess a second image information bit 55 of image information 54 [the two rightmost bits (53 and 55) in image information blocks 54 of FIG. 3(d)]. First bit assessment block 62 receives each pixel 40 of modified pixel information 36 as shown in FIG. 3(d). Next, first image information bit 53 of image information 54 is assessed at first bit assessment block 62. If first image information bit 53 of image information 54 is a "1", pixel 40 is channeled to second bit assessment block 64. In contrast, if first image information bit 53 of image information 54 is a "0", pixel 40 is channeled to second bit assessment block 66. Next, an assessment of second image information bit 55 of image information 54 is made at second bit assessment blocks 64 and 66 respectively.

In second bit assessment block 64 of FIG. 4, if second image information bit 55 of image information 54 is a "0" pixel 40 is channeled to pixel rendering option 70 for color image pixels. As such, that pixel will be rendered 72 using a selected image rendering process suitable for color images, for example, color image halftoning. In contrast, if second image information bit 55 of image information 54 is a "1", pixel 40 is channeled to rendering section 75 where pixel 40 is color converted and subsequently halftoned using a halftoning process specifically designed and optimized for a text/edge pixel.

Next, consider second bit assessment block 66. If second image information bit 55 of image information 54 is a "1" pixel 40 is channeled to rendering section 80 where pixel 40 undergoes TRC adjustment and is subsequently halftoned using a halftoning process specifically designed and optimized for a monochrome pixel. In contrast, if the second image information bit 55 of image information 54 is a "0", (see second bit assessment block 66) pixel 40 is channeled to pixel rendering section 85 where pixel 40 does not undergo a halftoning process, hence the halftoning process is avoided.

Figure 5A:
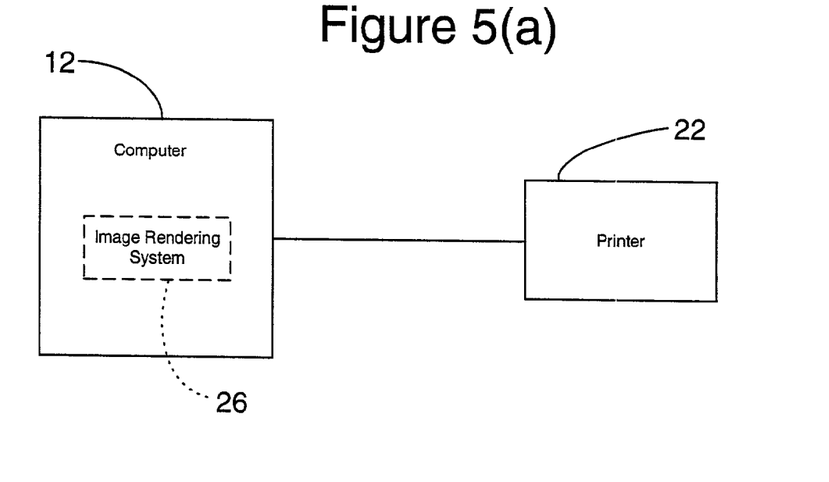
FIG. 5(a) shows an embodiment of the invention where the image rendering system is disposed in a computer.
Figure 5B:
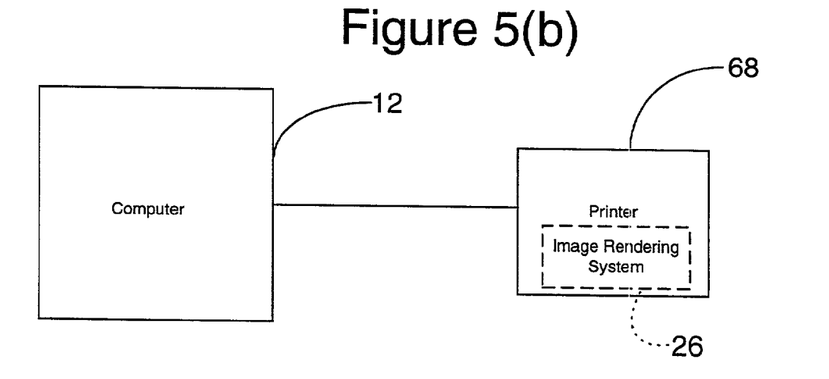
FIG. 5(b) shows an embodiment of the invention where the image rendering system is disposed a printer.
Figure 5C:
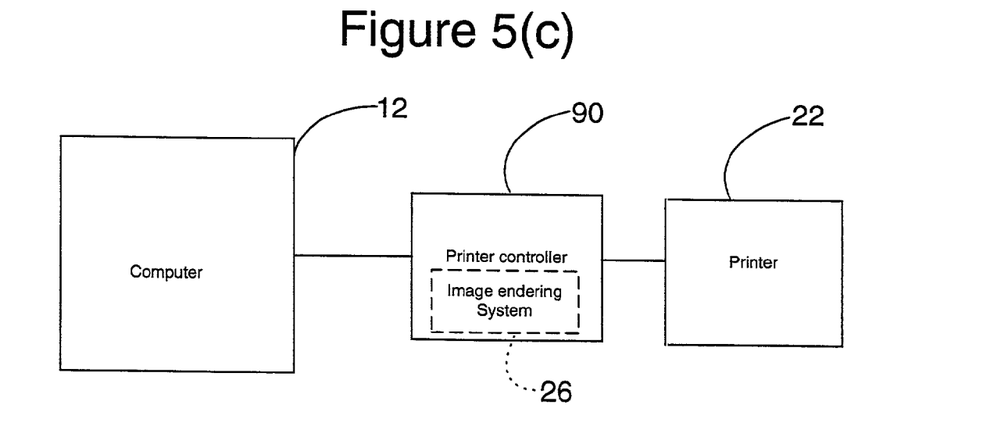
FIG. 5(c) shows an embodiment of the invention where the image rendering system is disposed in a printer controller.

The location of IRS print driver 19 in IRS 26 shown in FIG. 2 is flexible as illustrated in FIGS. 5(a), 5(b), and 5(c), collectively FIG. 5. FIG. 5(a) shows a preferred embodiment wherein the IRS 26 of the invention is disposed in a computer 12. The IRS 26 of the present invention could, however, be disposed in a printer 68, as shown in FIG. 5(b). Disposing the invention in printer 68 may be accomplished through implementing the process described in FIG. 4 within the printer's firmware or hardware (e.g., application specific integrated circuits). Another embodiment of the invention is shown in FIG. 5(c). Here, IRS 26 of the invention is disposed in a printer controller 90 located external to computer 12 and printer 22.

From the detailed description, it will be appreciated that the present invention provides a non-segmentation, individual pixel-by-pixel-based image rendering system having several objects and advantages including but not limited to the following: (1) The quality of the printed images is improved because each pixel of a homogeneous or heterogeneous image is rendered individually according to image information attached to each pixel; (2) The speed at which an image is printed is increased because some selected pixels are not rendered; and (3) heterogeneous images can be printed on relatively simple, inexpensive printers, such as inkjet printers, without being limited by object type.

Alternative embodiments will become apparent to those skilled in the art to which the present invention pertains without departing from its, spirit and scope. For example the preferred embodiment described herein categorizes each pixel into one of four image categories, although the pixels could be characterized in more or less categories. A larger number of categories may further increase the quality of images printed.

What is claimed is:

1. A non-segmentation, individual pixel-by-pixel method of processing source image data for rendering an image having a plurality of pixels, the method comprising:
    associating image information with each pixel of the image, the image information for each pixel including two image-information data bits, a first bit of the image-information bits indicating whether color processing or monochrome processing should be performed for rendering the pixel, and a second bit of the image-information data bits indicating a type of halftone processing that should be performed for rendering the pixel; and
    rendering each pixel of the image based on the first and second image-information bits that are associated with each pixel.

2. The method of claim 1, wherein the type of halftone processing includes one of color image halftone processing, text/edge halftone processing, monochrome halftone processing and white.

3. The method of claim 1, wherein when the first bit of the image-information data bits indicates color processing, the second bit of the image-information data bits indicates one of color image halftone processing and text/edge halftone processing.

4. The method of claim 1, wherein when the first bit of the image-information data bits indicates monochrome processing, the second bit of the image-information data bits indicates one of monochrome halftone processing and white.

5. A non-segmentation, individual pixel-by-pixel method of processing source image data for rendering source image data for an output device, the method comprising:
    associating image information with each pixel, the image information for each pixel including at least two image-information bits, a first bit of the image-information bits indicating whether color processing or monochrome processing should be performed for rendering the pixel and a second bit of the image-information data bits indicating a type of halftone processing that should be performed for rendering the pixel; and
    rendering each pixel of the source image using an image rendering process that is based on the first and second image-information bits associated with each pixel.

6. The method of claim 5, wherein the type of halftone process includes one of error diffusion and matrix thresholding.

7. The method of claim 5, wherein the type of halftone processing includes one of color image halftone processing, text/edge halftone processing, monochrome halftone processing and white.

8. The method of claim 5, wherein when the first bit of the image-information bits indicates color processing, the second bit of the image-information bits indicates one of color image halftone processing and text/edge halftone processing.

9. The method of claim 5, wherein when the first bit of the image-information bits indicates monochrome processing, the second bit of the image-information bits indicates one of monochrome halftone processing and white.

10. An image rendering system for instructing a printer in providing an image having a plurality of pixels, the image data for each pixel being a pixel data set having a predetermined number of data bits, the source image data for the image including a plurality of pixel data sets, the image rendering system comprising
    a data storage device for temporarily storing the pixel data sets of the image,
    associating software operatively coupled to the data storage device for associating one or more image information bits with each pixel data set in the data storage device, and
    print processing structure including an information coupling and assessment section, and a pixel rendering section, said information coupling and assessment section being responsive to the pixel data sets and the image information bits associated with each pixel data set for rendering the pixels of the image using an image rendering process which is selected by said information coupling and assessment section in relation to the image information associated with each pixel data set, and wherein the image information bits includes a first bit assessment block, and two second bit assessment blocks, with the first bit assessment block assessing a first image information bit, and the two second bit assessment blocks assessing a second image information bit.

11. The image-rendering system of claim 10, wherein the image-information associator distinguishes between: text pixels, edge pixels, monochrome pixels, and color pixels when associating the image-information bits with a pixel.

12. The image-rendering system of claim 10, wherein each pixel has an associated data set that has a most significant bit and a least significant bit, and wherein the image-information bits are further associated with the most significant bit of a data set associated with a pixel.

13. The image-rendering system of claim 10, wherein each pixel has an associated data set that has a most significant bit and a least significant bit, and wherein the image-information bits are further associated with the least significant bit of a data set associated with a pixel.

14. The image-rendering system of claim 10, wherein the image rendering system is part of a computer.

15. The image-rendering system of claim 10, wherein the image rendering system is part of a printer.

16. The image-rendering system of claim 10, wherein the image rendering system is part of a printer controller.

17. The image-rendering system of claim 10, wherein when the first bit of the image-information bits indicates color processing, the second bit of the image-information bits indicates one of color image halftone processing and text/edge halftone processing.

18. The image-rendering system of claim 10, wherein when the first bit of the image-information bits indicates monochrome processing, the second bit of the image-information bits indicates one of monochrome halftone processing and white.

* * * * *